United States Patent Office 3,466,334
Patented Sept. 9, 1969

3,466,334
CATALYTIC SYNTHESIS OF KETONES FROM A MIXTURE OF AN ALDEHYDE AND AN ACID
Howard S. Young and Jefferson Wayne Reynolds, Kingsport, Tenn., assignors to Eastman Kodak Company, Rochester, N.Y., a corporation of New Jersey
No Drawing. Filed Aug. 5, 1966, Ser. No. 570,440
Int. Cl. C07c 45/18, 49/06
U.S. Cl. 260—595          9 Claims

ABSTRACT OF THE DISCLOSURE

Process for preparing unsymmetrical ketones comprising passing at an elevated temperature an aldehyde reactant and a carboxylic acid reactant over a catlyst comprising oxidized lithium supported on activated alumina.

---

This invention relates to catalytic chemical reactions. More particularly, this invention is concerned with novel catalytic methods of producing ketones, and catalysts useful in such processes.

The conversion of aldehydes to ketones by catalytic means has been reported in the literature. See U.S. Patents 1,925,311 and 1,949,412. However, these patents and other prior art on the subject do not disclose the use of an oxidized form of lithium for catalyzing the synthesis of ketones from a mixture of an aldehyde and an acid.

According to the present invention, it has been discovered that by contacting a mixture of a saturated aliphatic aldehyde and a saturated aliphatic carboxylic acid with an oxidized form of lithium supported on alumina in the presence of water vapor and at an elevated temperature suitable for effecting the reaction there are produced aliphatic ketones. The process can be conducted as a batch process or a continuous process.

More specifically, the present invention provides the process of bringing a mixture of an aldehyde of the formula

and an aliphatic monocarboxylic acid of the formula

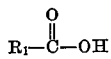

and water vapor into contact with a catalyst comprising an alumina-supported oxidized form of lithium, to produce a reaction product containing ketones of the formulas

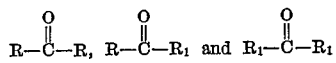

wherein R and R₁ are the same or different straight or branched chain lower alkyls such as methyl, ethyl, propyl, isopropyl and butyl.

When R and R₁ represent the same lower alkyl group the process leads to the formation of symmetrical ketones. However, when R and R₁ are different lower alkyls, the resulting reaction product will be a mixture of symmetrical and unsymmetrical ketones. Thus, when a mixture of acetaldehyde and isobutyric acid are reacted in the presence of water vapor and an alumina-supported, oxidized form of lithium there is produced as a reaction product a mixture of acetone, methyl isopropyl ketone and diisopropyl ketone. The ketones appear to be formed by the following reactions:

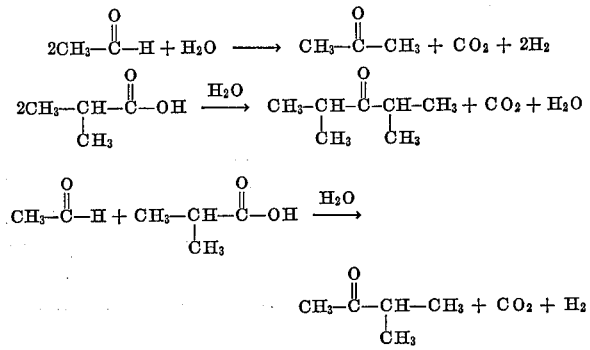

Among the saturated aliphatic aldehydes which can be used as reactants in the process are acetaldehyde, propionaldehyde, isobutyraldehyde and butyraldehyde, or a mixture of two or more of these or other lower aliphatic aldehydes, i.e. aldehydes containing up to eight carbons in a noncyclic saturated aliphatic chain.

Included within the saturated aliphatic monocarboxylic acids which can be used in the process are acetic acid, propionic acid, butyric acid, isobutyric acid and valeric acid. Generally, the process is most suitably applied using acids having up to eight carbons.

In order to effect the reaction it appears necessary that the lithium be present on the alumina support in an oxidized form. This oxidized form may be an oxide of lithium, a salt made from the reactants used or a salt of any catalyst support which might be employed. Lithium oxide nevertheless seems to be a main form through which the catalytic activity of lithium is routed or medaited. Lithium oxide thus can be used as such although it is suitable to employ compounds of lithium which are convertible to the oxide, including lithium carbonate, lithium nitrate, lithium acetate, lithium oxalate and lithium isobutyrate. When desired, mixtures of such compounds can also be used in forming the catalyst.

Alumina alone, free of lithium in an oxidized form, does not appreciably catalyze the reaction. The alumina support can be any of its active forms, including the gamma, eta, chi, kappa and theta forms.

The alumina supported catalyst can be readily formed by conventional procedures. In one procedure, a water-soluble lithium salt can be dissolved in water and the aqueous solution poured over activated alumina particles. By calcining prior to use in the reaction, the salt is converted to lithium oxide supported on the alumina. However, instead of such a prior calcining it is sometimes feasible to effect the conversion from salt to oxide during the reaction. Particularly useful supported catalysts can contain about 1% to 25% by weight of lithium calculated as the oxide.

Conversion of the mixture of aldehyde and acid to the desired ketones using the described lithium catalysts can be readily achieved at an elevated temperature which effects the reaction, which generally will be from about 400° C. to 650° C.

The reaction is readily effected at atmospheric pressure. However, increased or decreased pressures such as of about 0.1 to 5 atmospheres can also be used satisfactorily.

The reaction is conveniently effected by vaporizing the aldehyde and acid, then bringing the mixture together into contact with the catalyst and maintaining contact for sufficient time to effect reaction without forming excessive amounts of undesirable by-products. Usually a contact time of about 0.1 to 20 sec. is sufficient. The contact time in seconds is the milliliters of catalyst divided by the rate of flow of gaseous feed in milliliters per second at reaction conditions. The catalyst can be positioned in a suitable tube of glass or inert metal in a loosely packed state which permits the mixture of aldehyde and acid vapor and steam to pass through.

in the catalytic synthesis of acetone, methyl isopropyl ketone (MIPK) and diisopropyl ketone (DIPK) from acetaldehyde and isobutyric acid in the presence of steam at 450° C. The catalyst was placed in a tubular glass reactor having an inside diameter of 22 mm. and a 6 mm. outer diameter thermowell located concentrically inside of it. The catalyst bed was about 3 in. long. With feeds of 3.7 g. of acetaldehyde, 7.3 g. of isobutyric acid and 6.0 g. of steam per hour, the following results were obtained in three successive 2-hour runs, with yields being given in mole percent:

| Run | Grams produced | | | Percent yield based on acetaldehyde | | Percent yield based on isobutyric acid | |
|---|---|---|---|---|---|---|---|
| | Acetone | MIPK | DIPK | Acetone | MIPK | MIPK | DIPK |
| 1 | 0.5 | 5.5 | 2.9 | 11.5 | 43.5 | 40.2 | 32.3 |
| 2 | 0.6 | 6.1 | 3.1 | 12.9 | 46.4 | 44.0 | 33.5 |
| 3 | 0.2 | 2.9 | 2.1 | 7.8 | 36.6 | 25.8 | 27.8 |

The molar ratio of acid to aldehyde can conveniently be from about 1 part acid to about 0.2 to 5 parts aldehyde.

Water vapor, i.e. steam, should be present with the aldehyde and acid mixture at the time of reaction. A molar ratio of about one part organic feed (aldehyde plus acid) to about 0.1 to 25 parts steam gives particularly suitable results.

Among the ketones produced by the described process from the appropriate mixture of aldehyde and acid are acetone, diethyl ketone, methyl ethyl ketone, methyl propyl ketone, methyl isopropyl ketone and diisopropyl ketone. Clearly, when the aldehyde and acid have different alkyl groups, the reaction product will be a mixture of at least three ketones of which two will be symmetrical ketones and one an unsymmetrical ketone. The exact compositions of these ketones will depend on the aldehyde and acid reactants used. Conventional procedures can be used to separate the ketones from such mixtures, including fractionation under reduced pressure.

The ketones produced by this invention are well known compounds which have valuable uses as solvents for materials such as rubbers, elastomers, polyvinyl acetate, waxes, tars and other materials. They are also intermediates in making other products.

The following example is presented to illustrate the invention. In this example, yields are given in mole percent.

Example

A catalyst containing about 5% Li$_2$O was prepared from 321 g. of Harshaw Chemical Co. grade Al–0104T ⅛ in. activated gamma alumina tablets and 82.2 g. of lithium nitrate from the Allied Chemical Co. The alumina tablets had a surface area of 80–100 sq. meters per gram and a pore volume of 0.28–0.33 cc./g. This alumina, in the absence of a lithium compound, appears almost inactive in the process. The lithium nitrate was dissolved in 120 ml. of distilled water and poured onto the activated alumina in a porcelain evaporating dish with rapid stirring. The mixture was allowed to soak 2 hours with occasional stirring. Next, the material was heated on a hot plate while stirring constantly to give dry-appearing tablets. The tablets were transferred to a muffle furnace and calcined 1 hour at 450° C.

A quantity of 25 ml. of 8–20 mesh material prepared by crushing and screening the ⅛ in. tablets was tested Although the invention has been described in considerable detail with reference to certain preferred embodiments thereof, it will be understood that variations and modifications can be effected within the spirit and scope of the invention as described hereinabove and as defined in the appended claims.

What is claimed is:

1. Process for preparing a reaction product containing a major portion of aliphatic unsymmetrical ketone of the formula $$R-\overset{O}{\underset{\|}{C}}-R_1$$

comprising contacting an aliphatic aldehyde of the formula $$R-\overset{O}{\underset{\|}{C}}-H$$

and an aliphatic acid of the formula $$R_1-\overset{O}{\underset{\|}{C}}-OH$$

with a catalyst consisting essentially of about 1 to about 25 weight percent of lithium oxide supported on activated alumina, at a temperature of about 400° C. to about 650° C. and in the presence of water vapor, R and R$_1$ being different lower alkyl groups.

2. The process of claim 1 in which a contact time of about 0.1 to 20 seconds is used.

3. The process of claim 1 in which the alumina is in the gamma, eta, phi, kappa or theta form or mixtures thereof.

4. The process of claim 1 in which the molar ratio of acid to aldehyde is about 5:1 to 1:5.

5. The process of claim 1 in which the molar ratio of water vapor to the organic feed, comprising the acid and aldehyde, is from about 0.1:1 to 25:1.

6. The process of claim 1 in which the catalyst is lithium oxide supported on activated alumina.

7. Process of claim 1 wherein the aldehyde comprises acetaldehyde and the acid comprises isobutyric acid.

8. Process of claim 7 wherein the catalyst comprises a lithium oxide supported on activated alumina.

9. Process of claim 1 wherein the catalyst consists essentially of lithium oxide or a compound which is converted to lithium oxide at a temperature of about 400° C. to about 650° C. supported on activated alumina.

(References on following page)

References Cited

UNITED STATES PATENTS

| | | | |
|---|---|---|---|
| 1,755,193 | 4/1930 | Schlecht | 260—593 |
| 1,892,742 | 1/1933 | Walter et al. | 260—595 |
| 1,944,109 | 1/1934 | Roka | 260—293 |
| 2,474,440 | 6/1949 | Smith et al. | 252—463 |
| 2,664,446 | 12/1953 | Charlton et al. | 252—463 |
| 2,697,729 | 12/1954 | Ohlson et al. | 260—595 |

FOREIGN PATENTS 503,571    7/1930    Germany.

OTHER REFERENCES

Sabatier: Catalysis in Organic Chemistry, 1923 edition, pp. 301–304, D. Vannostrand Co., New York, N.Y.

Muller: Methoden der Organischen Chemie, Band 4, Teil 2 (1955), p. 226, Georg Thieme Verlag-Stuttgart.

DANIEL D. HORWITZ, Primary Examiner

U.S. Cl. X.R.

260—593

UNITED STATES PATENT OFFICE
CERTIFICATE OF CORRECTION

PO-1050
(5/69)

Patent No. 3,466,334    Dated September 9, 1969

Inventor(s) Howard S. Young; Jefferson W. Reynolds

It is certified that error appears in the above-identified patent and that said Letters Patent are hereby corrected as shown below:

Column 4, Claim 3, line 58, "phi" should read - - chi - -;

Column 4, Claim 9, line 70, "claim 1" should read - - claim 7 - -;

Column 4, Claim 9, line 71, the word "or" should read - - of - -.

SIGNED AND
SEALED
DEC 23 1969

(SEAL)
Attest:

Edward M. Fletcher, Jr.
Attesting Officer

WILLIAM E. SCHUYLER, JR.
Commissioner of Patents